INVENTOR.
ROBERT PALMAI

BY Douglas S. Johnson

Attorney

Feb. 14, 1967  R. PALMAI  3,304,356
METHOD OF PRODUCING PLASTIC FIBER FILTERS
Filed May 18, 1964  4 Sheets-Sheet 4

INVENTOR.
ROBERT PALMAI
BY
Douglas S. John
Attorney 3,304,356
METHOD OF PRODUCING PLASTIC FIBER
FILTERS
Robert Palmai, Preston, Ontario, Canada, assignor to
Kralinator Filters Limited, Preston, Ontario, Canada
Filed May 18, 1964, Ser. No. 367,954
Claims priority, application Canada, Apr. 18, 1964,
900,742
2 Claims. (Cl. 264—137)

This invention relates to improvements in the manufacture of filters of the type used in filtering dirt or other waste from the oil of circular lubricating systems and comprising a tubular length or sleeve of compressed fibrous filter material.

The conventional method of manufacture of filters composed of fibrous material is to feed the material into a can or cylinder which then provides the requisite circumferential support, the whole being known as a filter cartridge. The efficiency of such filter cartridges depends on the uniformity of the filter media and to overcome this problem a method is described in applicant's U.S. Patent 3,135,075 for producing filter cartridges by uniformly compressing the filter media into a compact mat with its subsequent placement in the supporting can or cylinder.

While this method overcomes the problem of ensuring uniformity of a particular density of the filter media along the length of the cartridge it is difficult to alter the degree of compaction and provide filters which differ in density, one from the other, but are uniform within themselves. Also it is even more difficult in this method to arrange for a controlled variation of density through the cross section of the filter although there are many applications for use of filters constructed in this way. Finally, the supporting cannister constitutes a significant porportion of the weight of the cartridge and if it could be eliminated the cost of transportation would be reduced.

To provide such filters, a method is described in applicant's U.S. Application S.N. 357,491 of producing filters composed of a mat of fibrous material which has been impregnated with a thermosetting resin, after which the mat is dried at a temperature below that at which curing of the resin commences, forming the dried mat into the requisite filter form and finally heating the formed filter to a temperature at which curing of the resin takes place. In the operation of this method it is convenient to form the dried mat into a circular form in a cylinder after which it is transferred into a circular mold provided with suitable heaters.

It was then realised that the flexibility of the method would be increased if arrangements were made to apply pressure to one end of the tubular form after transfer from the forming cylinder into the heated mold provided with a cover member, such pressure compacting the form to a predetermined degree; however, the operation of this method is difficult because the resilience causes the compressed filter to spring outwards beyond the entrance to the mold after the end pressure has been removed and the cover member to the mold cannot be applied in time to contain the filter form.

It has now been realised that the difficulty may be obviated if the compacting end pressure is maintained for a portion of the total time necessary to complete the curing. After elapse of this time it is found that the movement of the filter form in the mold is reduced to a rate which provides sufficient time for the cover member to be applied; however, since the movement of the form in the mold on release of pressure is not completely prevented it is necessary for the cover plate to be constructed to provide a re-compression on the tubular form corresponding to the amount of creep of the form in the mold which occurs after removal of the end compression. It has been found that, although the total time of curing occupies a period of say 3 to 4 mins., the time under which the compacting pressure is maintained to the end of the formed filter is of the order of 10 secs. after which period the tendency of the formed filter to spring out has been sufficiently reduced.

Accordingly, it is an object of the invention to provide an improvement in the method of producing a filter form from a dried resin impregnated mat which form is subsequently transferred and cured in a mold provided with a cover member, the improvement comprising the steps of applying heat and pressure to compress said filter form within said mold after transfer thereto, maintaining said pressure only for the time necessary to initiate curing of the resin and thereby reduce the resiliency of said filter form, releasing said pressure and closing said mold with said cover member to recompress said filter form to then complete the curing of said resin.

How this and other objects of this invention are achieved will become apparent in the light of the accompanying disclosure and with reference to the accompanying drawings, wherein.

Figure 5:
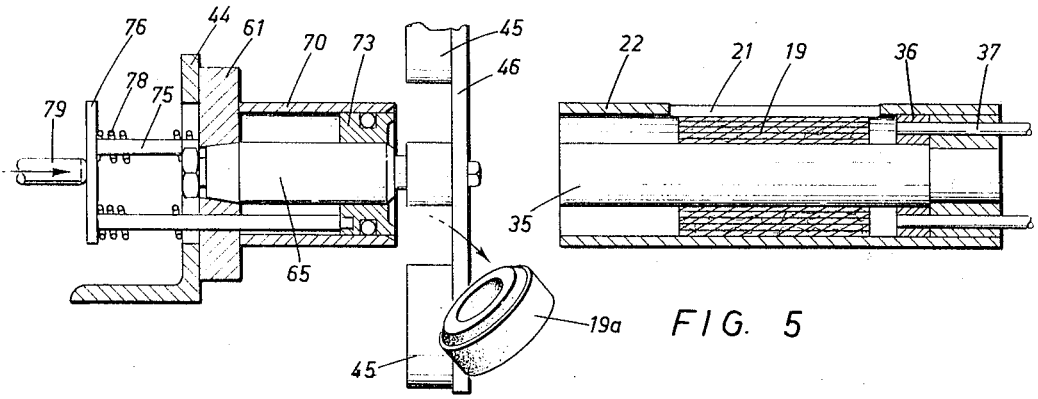
Figure 6:
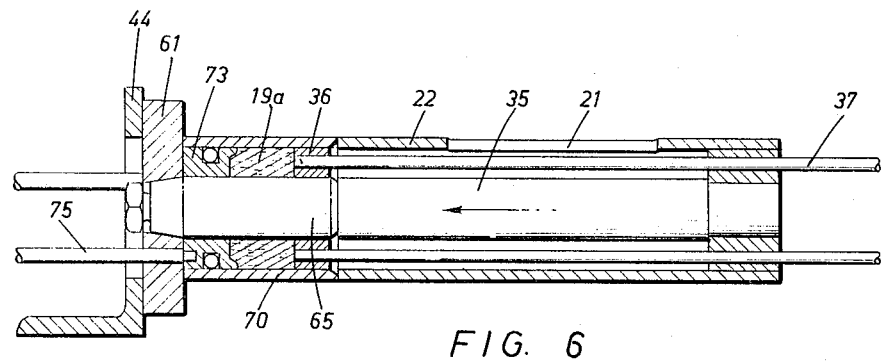
Figure 7:
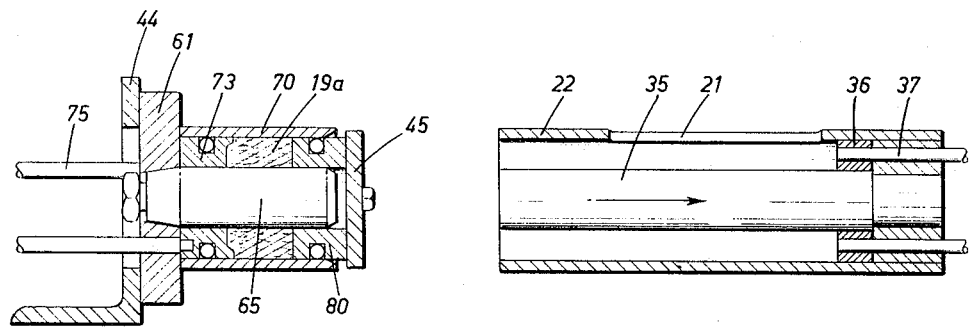

FIGURES 5, 6 and 7 diagrammatically illustrate the operation of the process.

Figure 1:
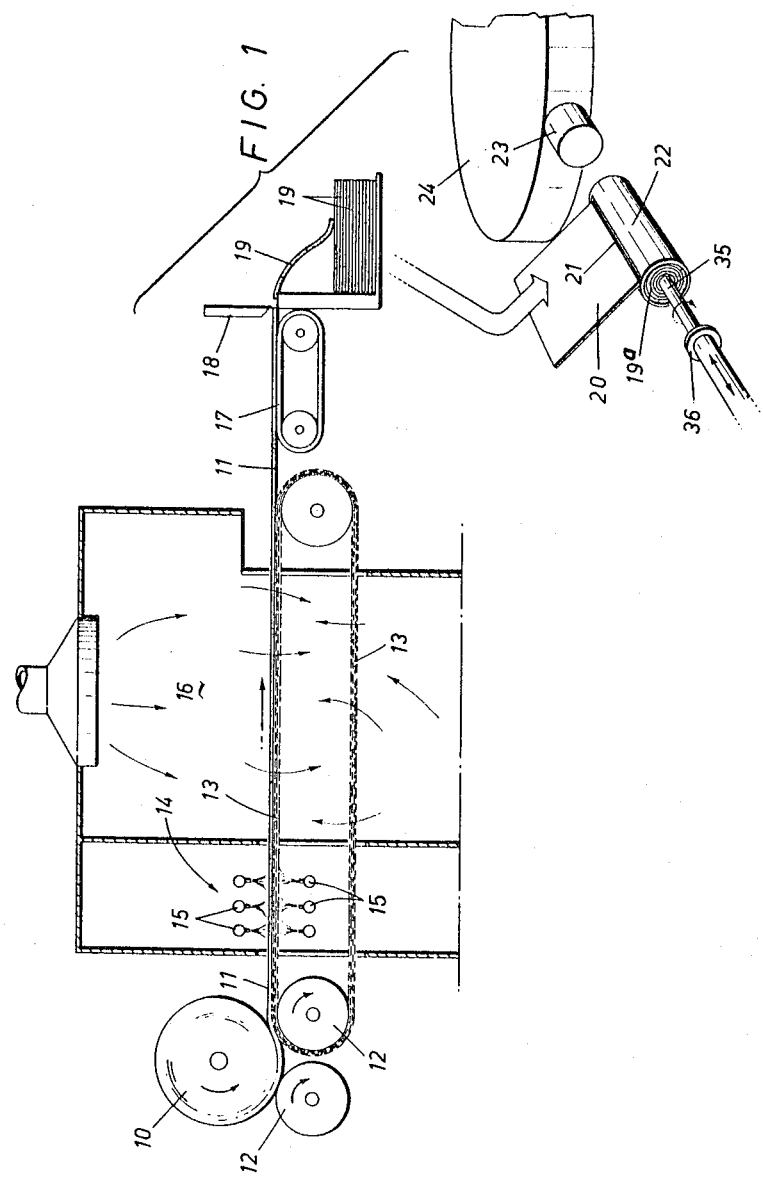
FIGURE 1 shows a diagrammatic layout illustrating the method of forming resin impregnated filters.

Referring now to FIGURE 1, a roll 10 of a mat 11 of predetermined density is propelled by a pair of rollers 12 to unwind the mat 11 onto an endless screen 13 to pass into a chamber 14 having a series of sprays 15 located above and below the mat 11 which impregnates it with resin. The mat 11 after impregnation travels through a drying chamber 16 after which it is transferred to an endless belt 17 associated with a cutter 18 which operates to provide suitable lengths of dried impregnated mat lengths 19. These are then transferred onto a guide 20 which is associated with a longitudinal slot 21 provided in a forming cylinder 22 and communicating with the interior; after the filter is formed it is transferred to the one in line of a bank of molds 23 conveniently carried on a turntable 24.

Figure 3:
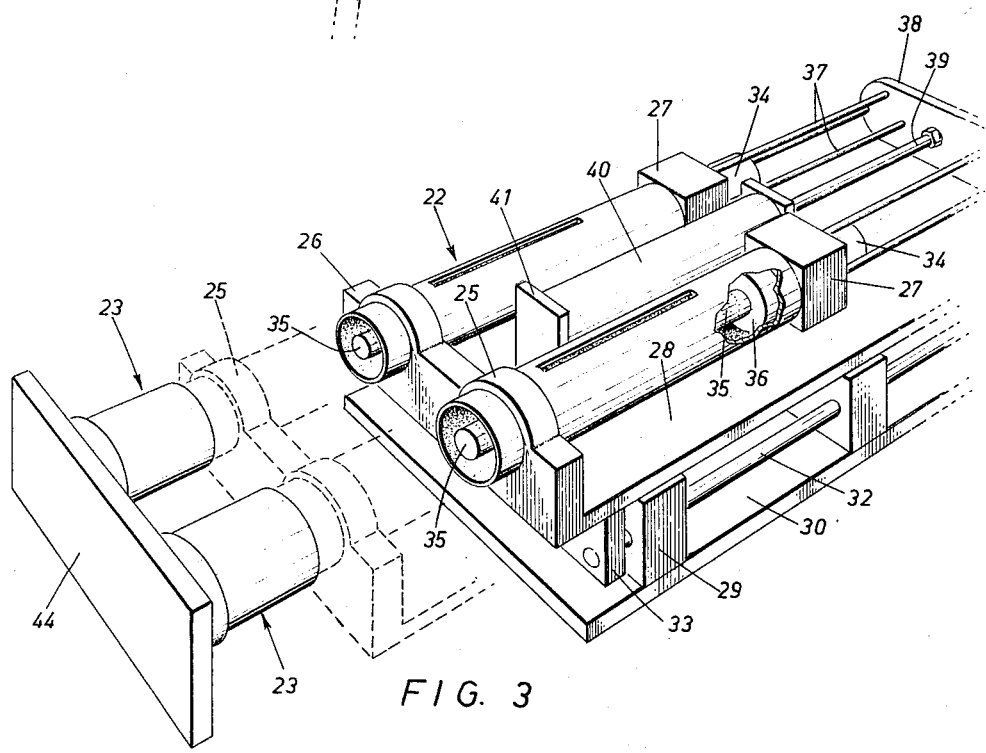
FIGURE 3 shows the arrangement of the forming cylinders.

With particular reference to FIGURE 3 one embodiment of the apparatus to carry out the invention will now be described in detail. For the purposes of productivity the forming cylinder 22 is duplicated by another positioned in spaced apart parallel relationship in the same horizontal plane. Collars 25 provided in a cross member 26 support the forming cylinders 22 adjacent their corresponding open ends; blocks 27 support the other corresponding ends of the forming cylinders 22. The cross member 26 and the blocks 27 are secured to a movable platform 28 which is, in turn, supported in sliding relation by a pair of spaced apart cross members 29 secured to a stationary platform 30. A pair of piston rods 32 traversing the spaced apart cross members 29 provide the means for moving the platform 28, the forward ends of the piston rods 32 being secured to another cross member 33 secured to the underside of the movable platform 28. Secured at the rear of each block 27 is an air motor 34 which provides drive means for an arbor 35 centrally disposed in the cylinder 22 and extending the length thereof, a suitable journal being provided in the block 27 to support the arbor 35. Spiked projections 35a see FIGURE 4 are provided on the arbor 35 of a length sufficient to ensure gripping of a mat length 19 by the arbor 35 on rotation.

Figure 4:
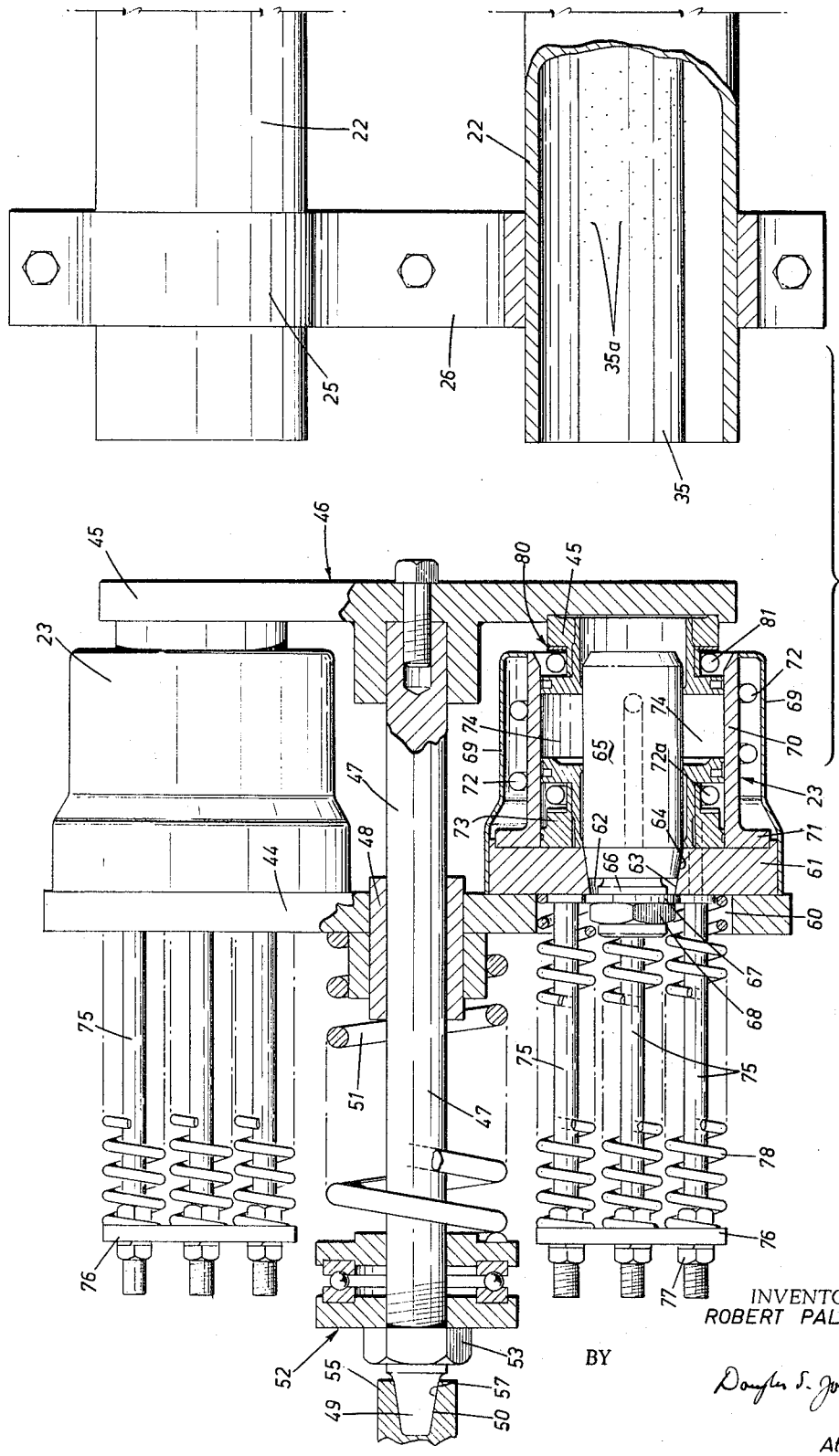
FIGURE 4 shows the details of a pair of molds and the arrangement for removing the cover plate and ejecting the cured filter forms.

In the position shown in FIGURE 3 the end of the forming cylinder 22 secured in the block 27 is closed by a movable plate 36 see FIGURE 5 which surrounds the arbor 35 in sliding relation with the tips of the projections 35a see FIGURE 4. The plate 36 is connected through suitable journals in the block 27 to rods 37, the other ends of which are secured to a cross member 38 see FIGURE 3. The free end of a piston rod 39 is secured to the cross member 38, the pison rod 39 being actuated in a cylinder 40 conveniently positioned intermediate of the forming cylinders 22, but which is independently supported from the movable platform 28 by an upright 41. It will be appreciated that the rods 37 may be actuated by the piston rod 39 to travel towards the open end of the forming cylinders 22 thus sliding the plate 36 along the arbor 35 and impelling the filter form forward; also the movable platform 28 may be actuated by the pair of piston rods 32 to bring the open ends of the forming cylinders 22 into contact with the molds 23. After the filter is formed it is transferred to the one in line of the bank of molds 23 conveniently carried on the turntable 24.

Figure 2:
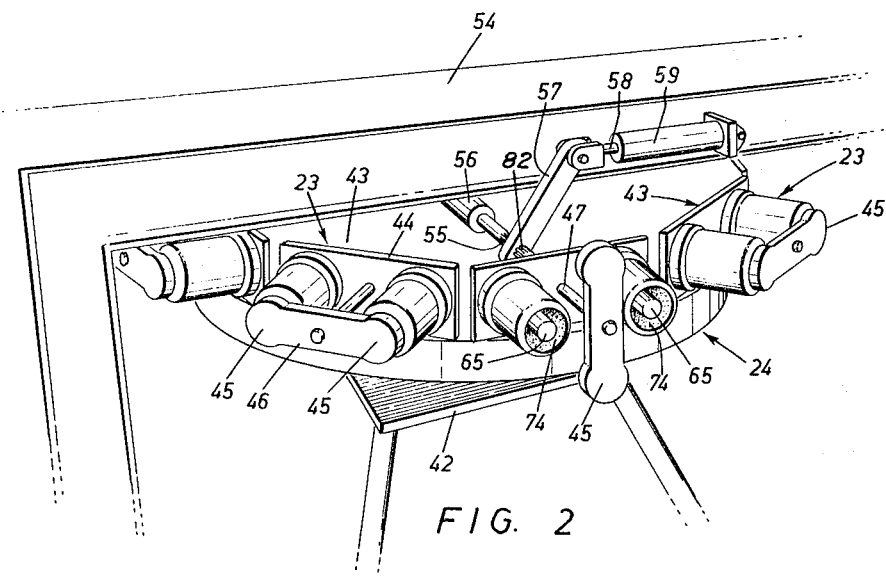
FIGURE 2 shows the arrangement of the molds in one embodiment.

With reference to FIGURES 2 and 4 the arrangement of the molds 23 to effect curing and ejection of the final form will now be described. The turntable 24 is provided with conventional means for intermittent spaced rotation and is carried on a suitable fixed support 42; the perimeter of the turntable 24 is defined by spaced apart angle plates 43 having one flange secured to the upper surface of the turntable 24, the other flange providing a flat wall 44 dimensioned to support a pair of spaced molds 23 having their outer ends in the same vertical plane. The cover plates 45 of each pair of molds are connected by a bridge member 46 which is bolted, as shown in FIGURE 4, to the end of a rod 47 which extends inwardly through a suitable journal 48 provided in the centre of the wall 44; the rod 47 terminates some distance short of the centre of the turntable 24 in a tapered male key member 49 provided with a shoulder 50. A spring 51 surrounds the rod 47, one end of the spring 51 compressively bearing against the inner surface of the wall 44 with the other end engaged to a coupler 52, the position of which is capable of adjustment by a nut 53 to vary the compression of the spring 51. The rotation of the turntable 24 is responsive to controls carried on a frame 54 see FIGURE 2 whereby each pair of molds 23 will halt in a position to bring the rod 47 in line with the free end of a horizontal piston rod 55 actuated in a cylinder 56 positioned close to the centre of the turntable 24 immediately above its surface. The configuration of the free end of the piston rod 55 provides a female key 57 see FIGURE 4 dimensioned to engage with the male key 49 when the piston rod 55 moves outward towards the end of the rod 47.

The intermediate portion of the rod 47 is provided with a spline or key way 82 in sliding relation with the end of an arm 57 pivotally secured at its other end to a piston rod 58 actuated by a cylinder 59 conveniently supported on the frame 54. The key way 82 is also shaped in that movement of the piston rod 58 will cause rotation of the rod 47.

The detail of each mold 23 is shown in FIGURE 4; the wall 44 is provided with an aperture 60 which is bridged by the base 61 of the mold 23. The base 61 is itself provided with an aperture 62, somewhat smaller than the aperture 60, having a tapered wall 63 which provides a support for the tapered seat 64 of a core 65. A pin 66 secured centrally to the core 65 traverses a plate 67 which bridges the aperture 62; the pin 66 is provided with a thread externally of the plate 67 and a nut 68 provides a means co-operating with the threaded end of the pin 66 to draw the core 65 downwards towards the base 61 so that the tapered seat 64 bears against the wall 63.

A shell 69 is secured to the side of the base 61 of the mold 23 and an inner wall 70 is secured to the base 61 by means of a flange 71. Heating elements 72 are positioned in the cavity formed between the shell 69 and the inner wall 70. The lower part of the mold cavity 74, formed between the inner wall 70 and the core 65, is sealed with a movable member 73 heated by a separate element 72a; the member 73 is secured to three equal spaced pins 75 which are suitably journalled in the base 61 to extend outwards through the aperture 60; the outer ends of the pins 75 are secured to a plate 76 by nuts 77 and the plate 76 is biased away from the base 61 by means of springs 78, one each surrounding a pin 75.

The end of a piston rod 79 shown in FIGURE 5 is positioned in spaced apart relationship from the plate 76 and on actuation by a cylinder, not shown, suitably secured above the turntable 24, the piston rod 79 moves forward to contact the plate 76 thereby moving the member 73 in relation to the core 65 to eject the cured filter form 19a. The upper part of the mold cavity 74 is closed by a removable member 80 see FIGURE 4 secured to the cover plate 45; the member 80 is provided with a separate heating element 81 and the member 80 is removable to enable substitution with one of a different length to effect a different degree of compression.

The operation of the apparatus is shown diagrammatically in FIGURES 5, 6 and 7. A pair of molds 23, only one which is shown, having completed one revolution of the turntable 24, are positioned opposite the respective forming cylinders 22. The cover plate 45 carried by the member 46 is removed outward of the mold 23 through action of the piston rod 55 and then rotated into a vertical position by actuation of the piston rod 58. On completion of this movement, the piston rod 79 moves forward to contact the plate 76 and thereby eject the filter form 19a from the mold cavity 74; after the filter form 19a has been ejected, the piston rod 79 moves backwards to allow the member 73 to sit at the base of the mold cavity 74.

At the same time a mat length 19 is fed through the longitudinal slot 21 into the forming cylinder 22, the arbor 35 rotating to spin a filter form 19a. Immediately this is completed the rotation of the arbor 35 is terminated and the platform 28, actuated by the pair of piston rods 32 moves forward to bring the forming cylinders 22 into at least close proximity with the respective molds 23, the arrangement being such that the arbor 35 is also in at least close proximity with the core 65. It has been found advantageous to make the diameter of the arbor 35 approximately $50/1000''$ greater in diameter than that of the core 65. At the same time the rods 37 actuated by the piston rod 39 travels towards the open end of the forming cylinder 22 to slide the plate 36 along the arbor 35 thereby impelling the filter form 19a forward and eventually into the mold cavity 74. The travel of the plate 36 is adjusted to provide a predetermined compression of the filter form in the mold cavity 74 and is maintained in this position for a period of approximately 10 seconds while the heating elements 72, 72a and 81 provide the temperature necessary to initiate the curing.

After elapse of this period of time the platform 28 is withdrawn by means of the piston rods 32 and the member 47 is rotated by movement of the arm 57 to a point where the mold covers 45 are in line with the mold cavities 74. The horizontal piston rod 55 is then withdrawn and due to the compression of the spring 51 each cover plate 45 closes a respective mold 23 and the member 80 re-compresses the filter form 19a to the predetermined degree. The turntable 24 then rotates the requisite degree to bring the next pair of molds 23 into position and the process is repeated.

While certain embodiments have been illustrated and described for the purpose of disclosure, it will be understood that the invention is not limited thereto, but contemplates such modifications and other embodiments as may be utilized without departing from the invention.

I claim:

1. In the method of producing filters from a mat of resilient fibrous material by impregnating said mat with a thermosetting resin after which the mat is dried at the temperature below that at which curing of the resin commences, forming said dried mat into a filter, transferring the formed filter into an open ended heated mold, closing said mold with a cover member to compress said filter form and heating said compressed filter form in said mold to effect curing of the resin, the improvement comprising the steps of applying heat and pressure to compress said filter form within said mold after transfer thereto, maintaining said pressure only for the time necessary to initiate curing of the resin and thereby reduce the resiliency of said filter form, releasing said pressure and closing said mold with said cover member to recompress said filter form to then complete the curing of said resin.

2. A method according to claim 1 wherein the time necessary to initiate curing of the resin to thereby reduce the resiliency of said filter form is about 10 seconds.

References Cited by the Examiner

UNITED STATES PATENTS

| | | | |
|---|---|---|---|
| 2,923,034 | 2/1960 | Dickie et al. | 264—123 |
| 3,014,830 | 12/1961 | Stallard et al. | 264—123 |
| 3,134,137 | 5/1964 | Immel | 18—4 |
| 3,193,874 | 7/1965 | Joblonski | 18—4 |
| 3,230,287 | 1/1966 | Caron et al. | 264—120 |

ROBERT F. WHITE, *Primary Examiner.*

J. R. HALL, *Assistant Examiner.*